United States Patent
Chrapek et al.

(10) Patent No.: US 12,380,036 B2
(45) Date of Patent: Aug. 5, 2025

(54) CACHE OPTIMIZATION MECHANISM

(71) Applicant: Intel Corporation, Santa Clara, CA (US)

(72) Inventors: Marcin Andrzej Chrapek, Zurich (CH); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 136 days.

(21) Appl. No.: 17/986,528

(22) Filed: Nov. 14, 2022

(65) Prior Publication Data

US 2024/0160581 A1    May 16, 2024

(51) Int. Cl.
*G06F 12/14* (2006.01)
*G06F 12/08* (2016.01)
*G06F 12/0842* (2016.01)

(52) U.S. Cl.
CPC ...... *G06F 12/1408* (2013.01); *G06F 12/0842* (2013.01); *G06F 2212/402* (2013.01)

(58) Field of Classification Search
CPC ...... G06F 12/1408; G06F 12/14; G06F 12/08; G06F 12/0842; G06F 2212/402; G06F 2212/1052
See application file for complete search history.

(56) References Cited

U.S. PATENT DOCUMENTS

| | | | |
|---|---|---|---|
| 2019/0042481 A1* | 2/2019 | Feghali | H04L 9/0894 |
| 2022/0107808 A1* | 4/2022 | Enamandram | G06F 9/30101 |
| 2022/0150055 A1* | 5/2022 | Cui | H04L 9/0825 |
| 2022/0239696 A1* | 7/2022 | Konda | H04L 61/4511 |
| 2023/0350814 A1* | 11/2023 | Unterluggauer | G06F 12/0811 |

FOREIGN PATENT DOCUMENTS

| | | | | |
|---|---|---|---|---|
| WO | WO-2022066179 A1 * | 3/2022 | | G06F 9/5016 |
| WO | WO-2022067120 A1 * | 3/2022 | | G06F 1/26 |

OTHER PUBLICATIONS

P. Shantharama, A. S. Thyagaturu and M. Reisslein, "Hardware-Accelerated Platforms and Infrastructures for Network Functions: A Survey of Enabling Technologies and Research Studies," in IEEE Access, vol. 8, pp. 132021-132085, 2020.*
D. Reis, H. Geng, M. Niemier and X. S. Hu, "Imcrypto: An In-Memory Computing Fabric for AES Encryption and Decryption," in IEEE Transactions on Very Large Scale Integration (VLSI) Systems, vol. 30, No. 5, pp. 553-565, May 2022.*
F. Turan, R. de Clercq, P. Maene, O. Reparaz and I. Verbauwhede, "Hardware acceleration of a software-based VPN," 2016 26th International Conference on Field Programmable Logic and Applications (FPL), Lausanne, Switzerland, 2016, pp. 1-9.*

(Continued)

*Primary Examiner* — Pierre Michel Bataille
(74) *Attorney, Agent, or Firm* — JAFFERY WATSON HAMILTON & DESANCTIS LLP

(57) ABSTRACT

An apparatus includes a central processing unit (CPU), including a plurality of processing cores, each having a cache memory, a fabric interconnect coupled to the plurality of processing cores and cryptographic circuitry, coupled to the fabric interconnect including mesh stop station to receive memory data and determine a destination of the memory data and encryption circuitry to encrypt/decrypt the memory data based on a destination of the memory data.

20 Claims, 12 Drawing Sheets

(56) References Cited

OTHER PUBLICATIONS

B. Rogers, M. Prvulovic and Y. Solihin, "Efficient data protection for distributed shared memory multiprocessors," 2006 International Conference on Parallel Architectures and Compilation Techniques (PACT), Seattle, WA, USA, 2006, pp. 84-94.*
F. Hou, H. He, N. Xiao, F. Liu and G. Zhong, "Efficient Encryption-Authentication of Shared Bus-Memory in SMP System," 2010 10th IEEE International Conference on Computer and Information Technology, Bradford, UK, 2010, pp. 871-876.*
W. Shi, H. S. Lee, M. Ghosh and C. Lu, "Architectural support for high speed protection of memory integrity and confidentiality in multiprocessor systems," Proceedings. 13th International Conference on Parallel Architecture and Compilation Techniques, PACT 2004, Antibes, Juan-les-Pins, France, 2004, pp. 123-134.*

* cited by examiner

CACHE OPTIMIZATION MECHANISM

BACKGROUND OF THE DESCRIPTION

Direct cache access allows external devices to write directly to processor caches instead of to memory (e.g., via Data Direct I/O (DDIO) Technology, compute express link (CXL), etc.), which improves the performance of such accesses for most applications.

BRIEF DESCRIPTION OF THE DRAWINGS

So that the manner in which the above recited features of the present embodiment can be understood in detail, a more particular description of the embodiment, briefly summarized above, may be had by reference to embodiments, some of which are illustrated in the appended drawings. It is to be noted, however, that the appended drawings illustrate only typical embodiments of this embodiment and are therefore not to be considered limiting of its scope, for the embodiment may admit to other equally effective embodiments.

FIGS. 6A-6D illustrate embodiments of a memory sharing architecture.

DETAILED DESCRIPTION

In the following description, numerous specific details are set forth to provide a more thorough understanding of the present embodiment. However, it will be apparent to one of skill in the art that the present embodiment may be practiced without one or more of these specific details. In other instances, well-known features have not been described in order to avoid obscuring the present embodiment.

In embodiments, an attestation mechanism is provided to report platform component firmware and generate keys based on the firmware measurement. In further embodiments, the keys are used to perform attestation with a computer system operating as a relying party. In still further embodiments, permissions tuples are received from a relying party for one or more components once the attestation has been completed.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements cooperate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
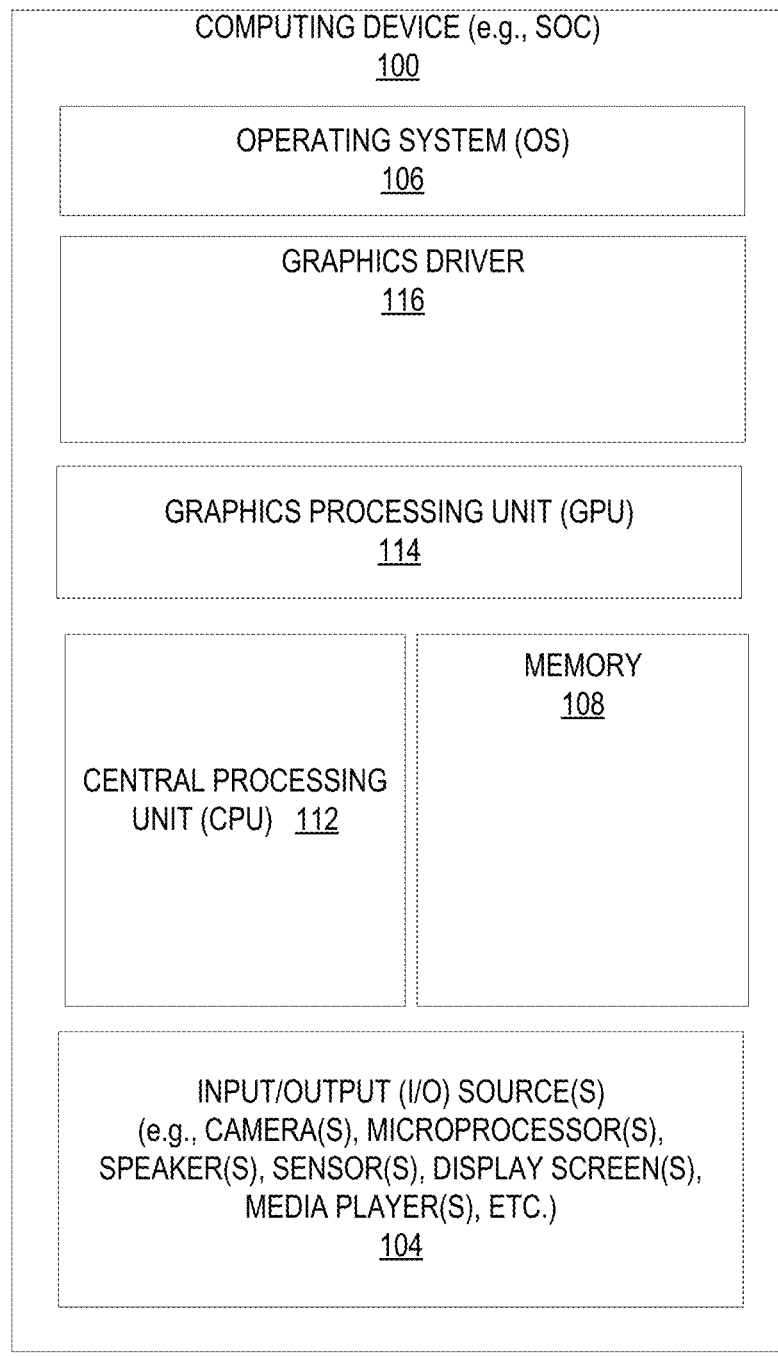
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
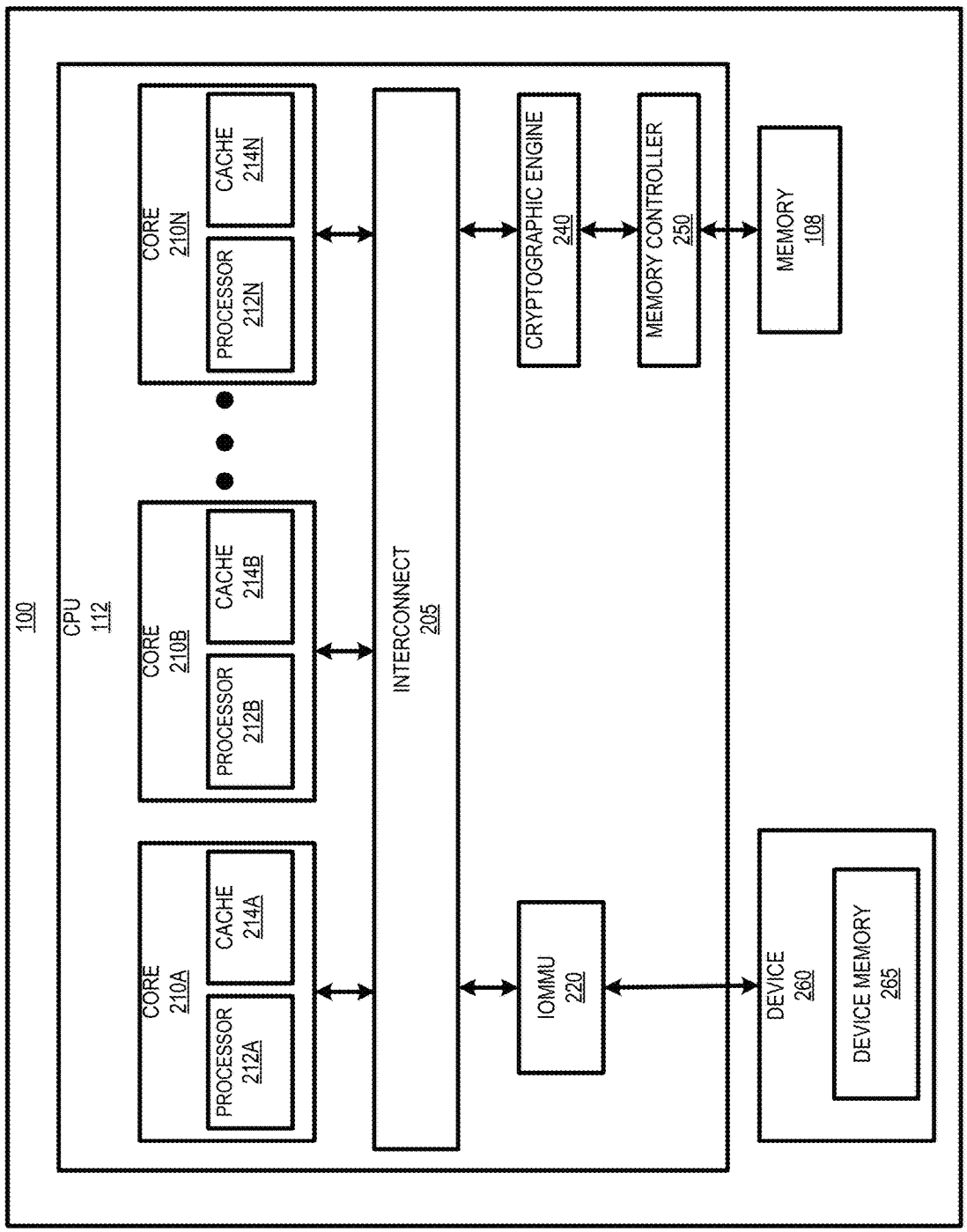
FIG. 2 illustrates another embodiment of a computing device.

According to one embodiment, computing device 100 may implement a multi-core interconnect architecture. FIG. 2 illustrates one embodiment of computing device 100 implementing a multi-core interconnect architecture. As shown in FIG. 2, CPU 112 includes a plurality of processing cores 210 (e.g., 210A-210N), each including a processor 212 (e.g., 212A-212N) and a cache 214 (e.g., 214A-214N) interconnected via an interconnect 205. In one embodiment, interconnect 205 is a mesh fabric that comprises a 2-dimensional array of half rings forming a system-wide interconnect grid.

Input-output memory management unit (IOMMU) 220 is also coupled to interconnect 205. IOMMU 220 is a memory management unit that couples to device 260 via an IO interface to perform direct memory access (DMA) transfers between a local memory 265 and memory 108. Additionally, memory 108 is coupled to memory controller 250, which is in turn coupled to cryptographic engine 240 that performs cryptographic functions to secure memory stored to memory 108.

Figure 3:
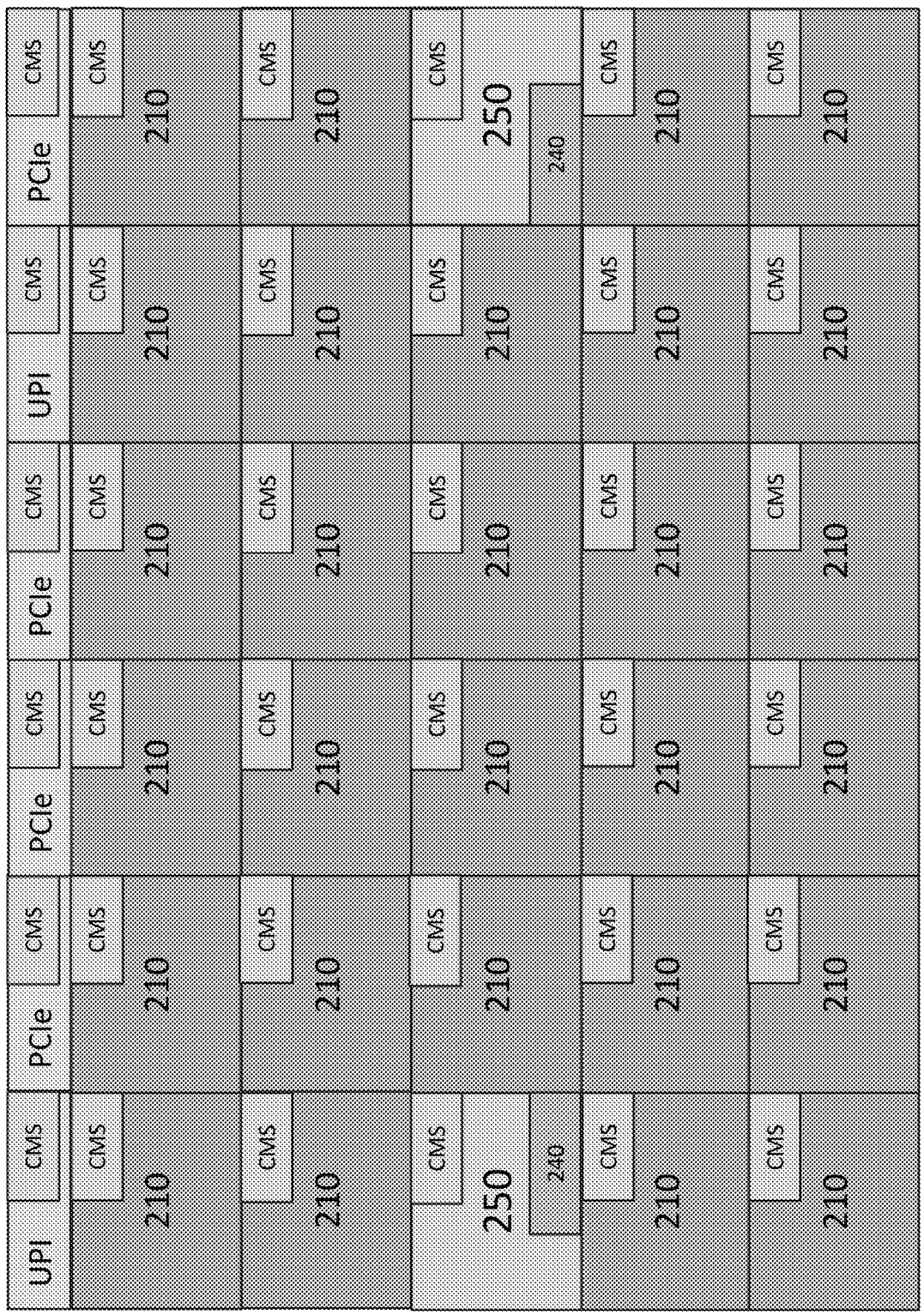
FIG. 3 illustrates an exemplary multi-core interconnect architecture.

In one embodiment, the mesh fabric may be configured according to a tile-based architecture. In such an embodiment, each component coupled to interconnect 205 is configured as a tile, which comprises a modular block that may be replicated. FIG. 3 illustrates one embodiment of a tile-based multi-core interconnect architecture. As shown in FIG. 3, the architecture includes core tiles 210 and integrated memory controller (IMC) tiles 250. Additionally, each tile includes a common mesh station (CMS). In one embodiment, the CMS is a mesh stop station that facilitates the interface between a tile and the fabric. Additionally, IO peripheral tiles (e.g., Peripheral Component Interconnect Express (PCIe) and Ultra Path Interconnect (UPI) tiles) are included. UPI is a point-to-point processor interconnect that couples CPU 112 to other CPUs.

Data is transferred within the mesh fabric using packets. In one embodiment, a packet originates at a tile or an IO peripheral. The packet then enters the fabric at its local CMS. The packet is then routed along the vertical half ring, either north or south, always taking the shortest path. Once the packet reaches its destination row, it will be taken off the vertical half ring and placed on the horizontal half ring where it will continue to the destination tile. Once the packet reaches the destination tile, it will interface back with the tile via CMS.

As discussed above, direct cache access allows external devices to write directly to caches instead of to memory which offers performance improvements for many workloads. However, if the computing device 100 implements cryptographic engine 240 during confidential data transfers (e.g., especially for memory-to-memory transfers) by encrypting/decrypting memory data prior to transferring to cache or from IO, direct cache access cannot be enabled. For example, a data write received from device 260 is first written to memory with encryption and then decrypted prior to being committed to the cache. Current systems that enable direct cache access achieve data protection not by using the cryptographic engines within the CPU but by using separate cryptographic engines for each IO port which limits confidentiality to only point-to-point links (e.g., CXL). Per link cryptographic engines also create redundancy because the existing cryptographic engines within the CPU are not utilized for IO operations.

Figure 4:
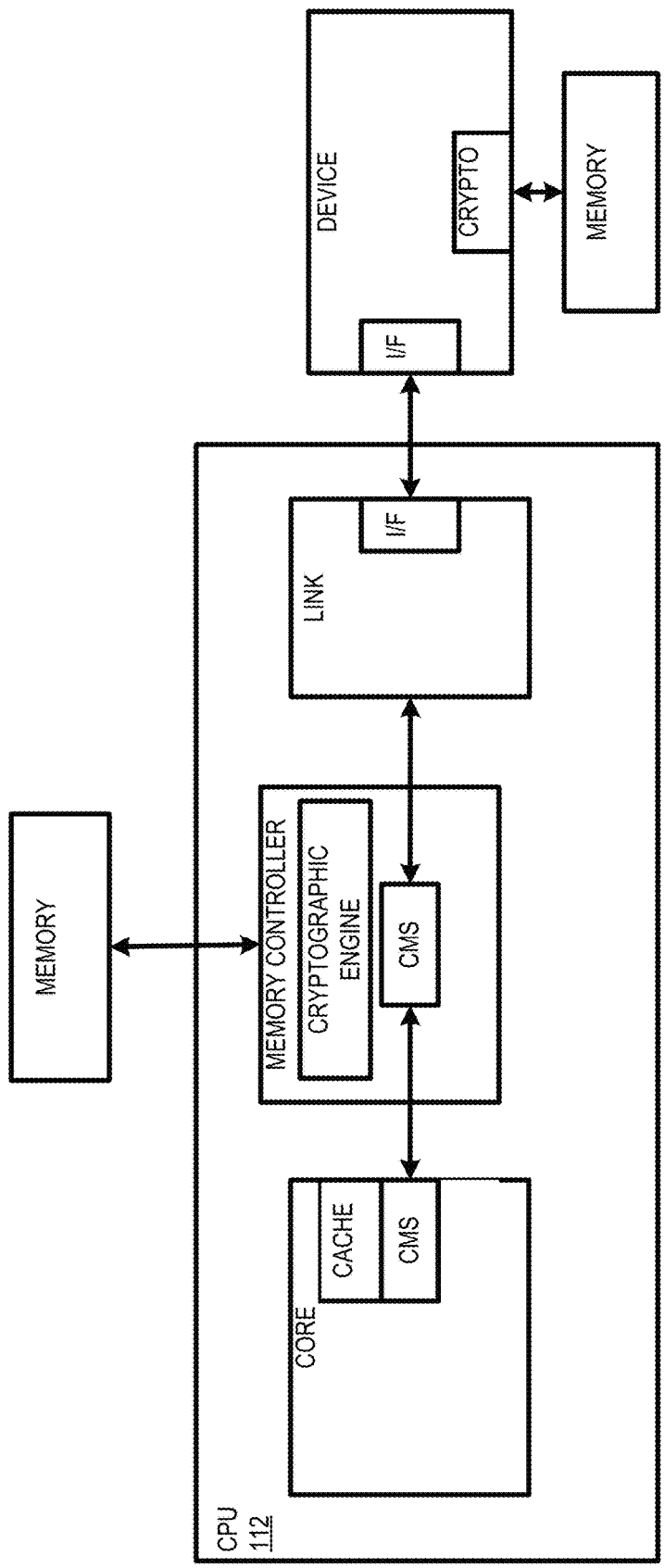
FIG. 4 illustrates an exemplary memory sharing architecture.

FIG. 4 illustrates a conventional computing device with a single core and connected to an external storage device. In the usual flow for storing operations without the direct cache access, data from the CPU cache is encrypted at a cryptographic engine and decrypted when leaving the memory. The data is subsequently encrypted at a link (e.g., integrity and data encryption (IDE)) and transmitted to an IO device via interfaces. The data is again encrypted at a cryptographic module of the IO device prior to storing in device memory. When the data is retrieved to cache, it is first decrypted at the cryptographic module of the IO device and then encrypted at the device interface before being transmitted to the CPU link. Subsequently, the data is decrypted at the link interface and again encrypted at the cryptographic engine for storage at the memory. When the cache finally accesses the data it must again be decrypted at the cryptographic engine. As shown above, up to ten encryption/decryption operations occur in order to store and retrieve data from cache. If direct cache access with an IO device is enabled, this number can be reduced to eight operations. This example could be extended to a larger number of devices. This would require adding cryptographic engine per IO link interface of the computing device which scales poorly as it considerably increases the power and space requirements.

According to one embodiment, cryptographic engine 240 is configured to replace poorly scaling per link cryptographic engines and to enable direct cache access with an IO device for confidential data transfers solving the two distinct problems. In such an embodiment, cryptographic engine 240 is configured to operate in a direct cache access mode. In the direct cache access mode, cryptographic engine 240 detects whether the destination of a data transaction is to memory or cache/IO. Upon determining that the data transaction is for cache or TO, cryptographic engine 240 bypasses a write to memory and passes the decrypted/encrypted data directly back onto the mesh interface to be received at the CPU cache or at the CPU IO ports. In a further embodiment, a message type identifier (ID) is introduced to enable the mesh interface to deliver the data to the CPU cache or the IO ports. In yet a further embodiment, the direct cache access mode may be enabled or disabled for each page of memory. In such an embodiment, page tables within IOMMU 220 and the memory controller 250 indicate which pages are enabled to operate in the direct cache access mode.

Figure 5:
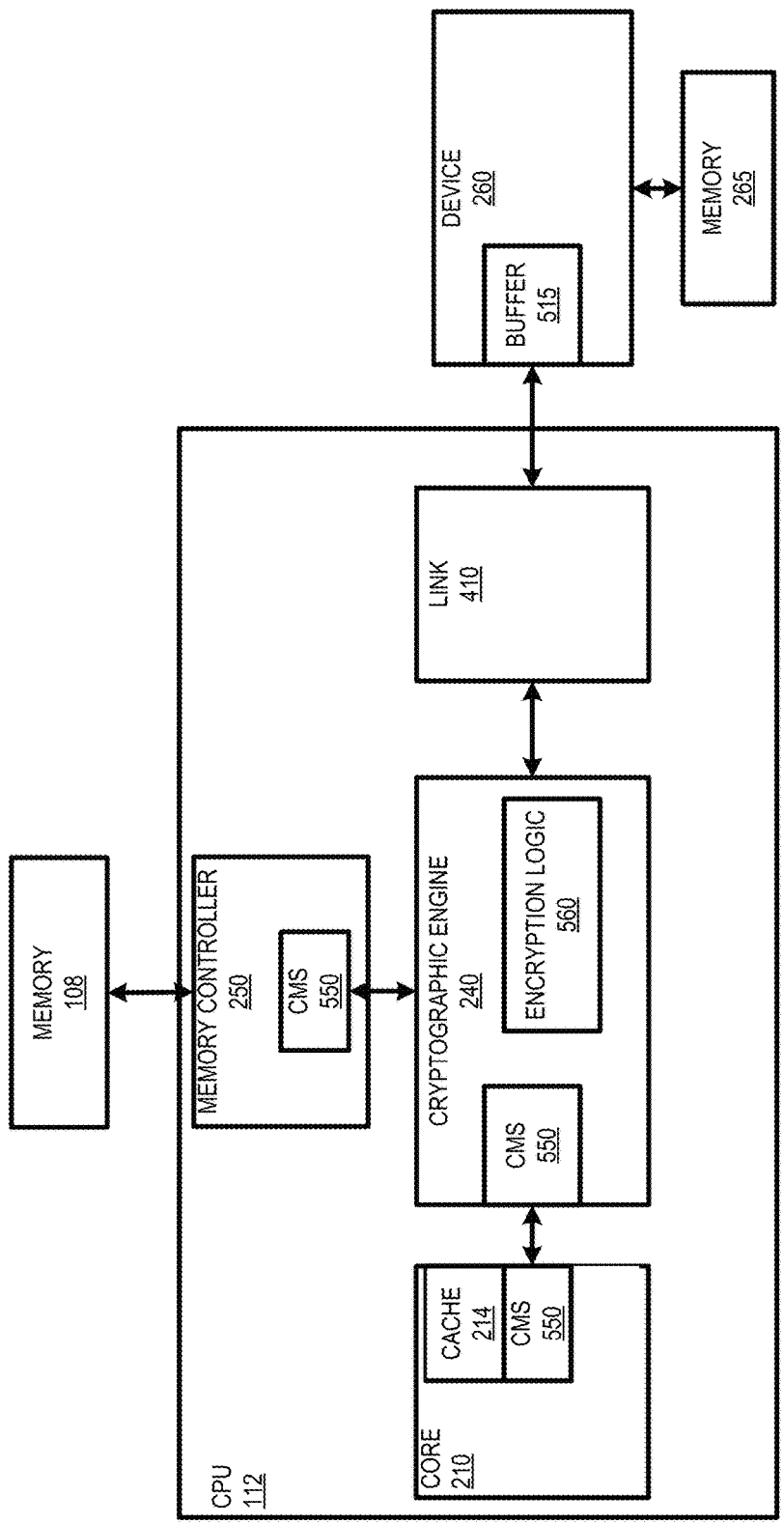
FIG. 5 illustrates one embodiment of a memory sharing architecture.

FIG. 5 illustrates one embodiment of a memory sharing architecture enabling direct cache access with an TO device 260. As shown in FIG. 5, cryptographic module interfaces are removed from link 410 and TO device 260. Additionally, cryptographic module within the TO device 260 has been removed. During operation in the direct cache access mode and for the usual data storage flow, data is sent from the cache 214 to the cryptographic engine 240 and encrypted at the cryptographic engine 240 via encryption logic 560. The encrypted data is then transmitted to link 410 and forwarded to device 260 where it is received at a buffer 515 upon determining that device 260 is the destination. Subsequently, the encrypted data is stored in the device memory 265. In one embodiment, link 410 comprises a compute express link (CXL). However other CPU to device connections may be implemented in different embodiments.

In one embodiment, the encrypted data may include one or more integrity bits for protection. In such an embodiment, encryption logic 560 computes a cryptographic hash of the raw data and uses the ECC bits to store the hash in memory 265 along with the encrypted data. When the encrypted data is fetched the encryption logic decrypts it and also computes the cryptographic hash which it compares with the ECC retrieved from the memory. In another embodiment, the hash may be stored as metadata and read verified by the encryption logic when it retrieves encrypted data. Also, use of cryptographic tweaks such as mixing the physical address with the encryption key may provide assurances that a physical attack to move the cryptographic data to another location in memory is detected. In yet a further embodiment, integrity bits may be transmitted with the data to be stored at device 260.

During the usual data retrieval flow, encrypted data is read from device memory 265 and passed to the device buffer 515. The encrypted data is then received at link 410 and forwarded to cryptographic engine 240 where the destination of the data is determined. In one embodiment, cryptographic engine 240 includes a CMS 550 that enables cryptographic engine 240 to interface directly with interconnect 205 and determine the destination of the data by examining tile packet data. Cryptographic engine 240 implements CMS 550 to store the encrypted data in memory 108 upon determining that memory 108 is the destination. However, cryptographic engine 240 implements encryption logic 560 to decrypt the data and passes the decrypted data directly to cache 214 upon determining that cache 214 is the destination.

According to one embodiment, the CMS 550 within cryptographic engine 240 receives packets in order to determine the destination. In this embodiment in case of encrypted pages, IOMMU 220 transmits data to the cryptographic engine 240 whenever direct cache access is enabled for a particular page. Otherwise, the data is transmitted directly to memory 108. In this embodiment in case of encrypted pages, the memory controller 250 transmits the data to the cryptographic engine 240 which may either forward the data directly to the IO link 410 or store it in memory 108. In this embodiment in case of non-encrypted pages, the standard flow applies for pages with direct cache access enabled where the data gets passed to the cache 214 or IO link 410 directly without involvement of the cryptographic engine 240.

For storing data to device memory 265, cryptographic engine 240 receives data from cache 214 and encrypts the data via encryption logic 560. Subsequently, cryptographic engine 240 determines the destination of the encrypted data. Upon determining that memory 108 is the destination, cryptographic engine 240 passes the encrypted data to memory 108. Cryptographic engine 240 passes the encrypted data to link 410 upon determining that device memory 265 is the destination. Subsequently, the encrypted data is passed to the device buffer 515 via link 410 prior to being stored in memory 265.

As discussed above, cryptographic engine 240 may determine whether a page being accessed is enabled to operate in the direct cache access mode. In this embodiment, cryptographic engine 240 accesses page tables within IOMMU 220 or memory controller 250 to determine whether the memory page is enabled to be transmitted directly to cache 214 from memory 265, or transmitted directly to memory 265 from cache 214, without first being stored within memory 108. To support the legacy mode, IOMMU 220 tables may indicate whether the page is to be encrypted. If not, the data may be transmitted directly to and from cache 214 avoiding cryptographic engine 240.

Figure 6A:
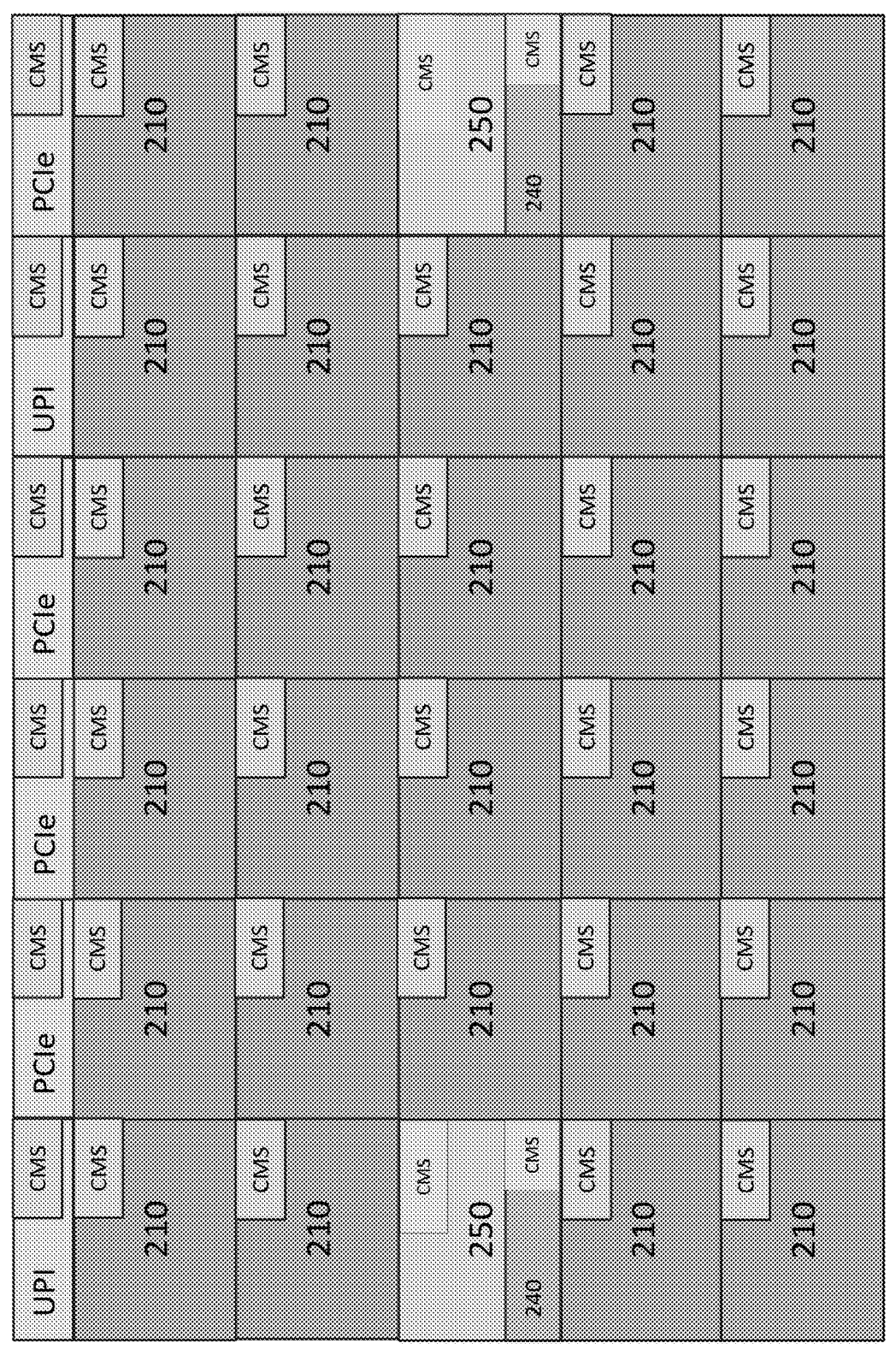
Figure 6B:
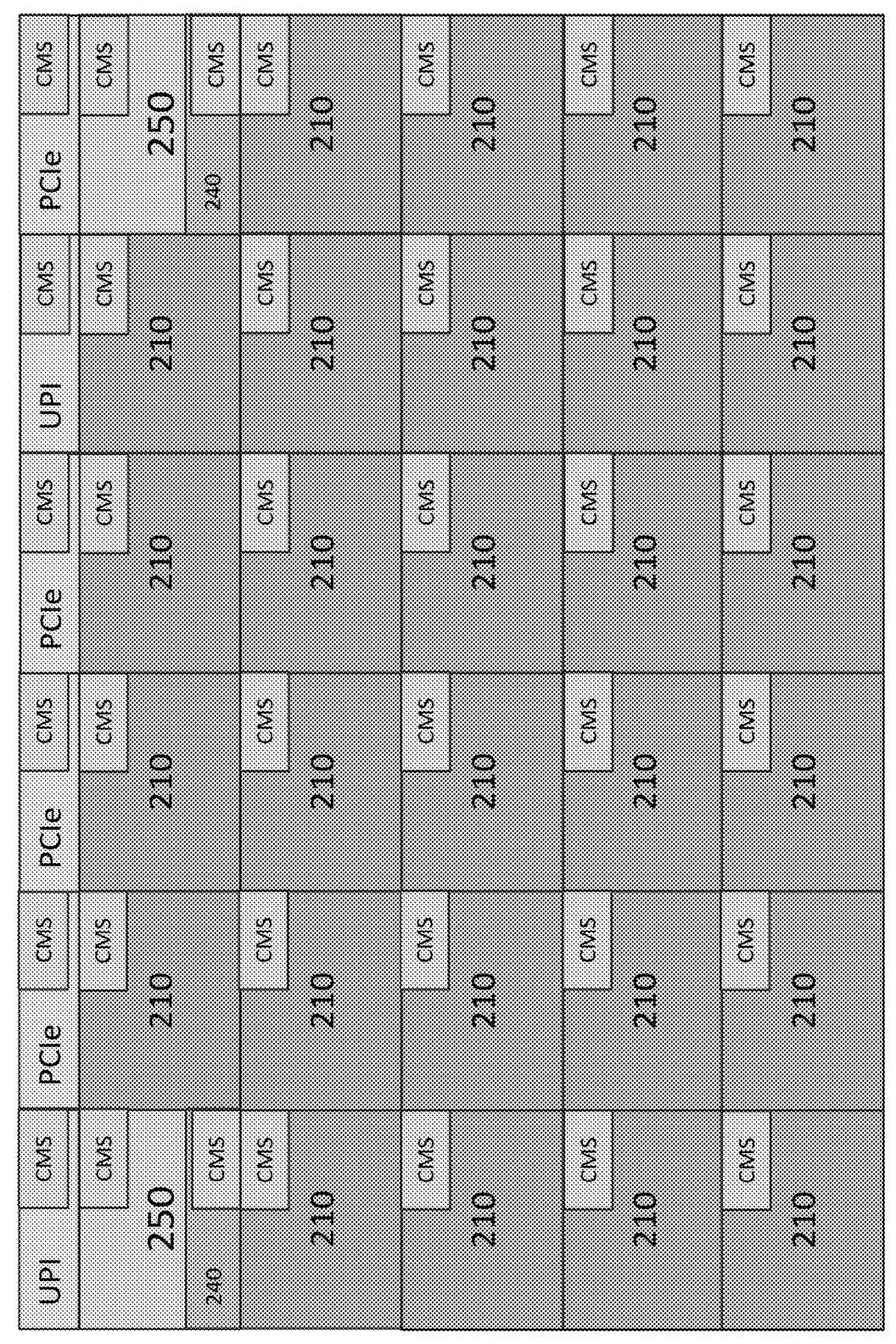

FIGS. 6A-6D illustrate embodiments of a tile-based multi-core interconnect architecture configured to implement the direct cache access mode. As shown in FIG. 6A, cryptographic engine 240 includes a CMS. FIG. 6B illustrates an embodiment in which the IMC 250 and cryptographic engine 240 tile is moved higher within the tile architecture. This embodiment features lower TO latency and mesh contention. However, there is a higher average memory access latency.

Figure 6C:
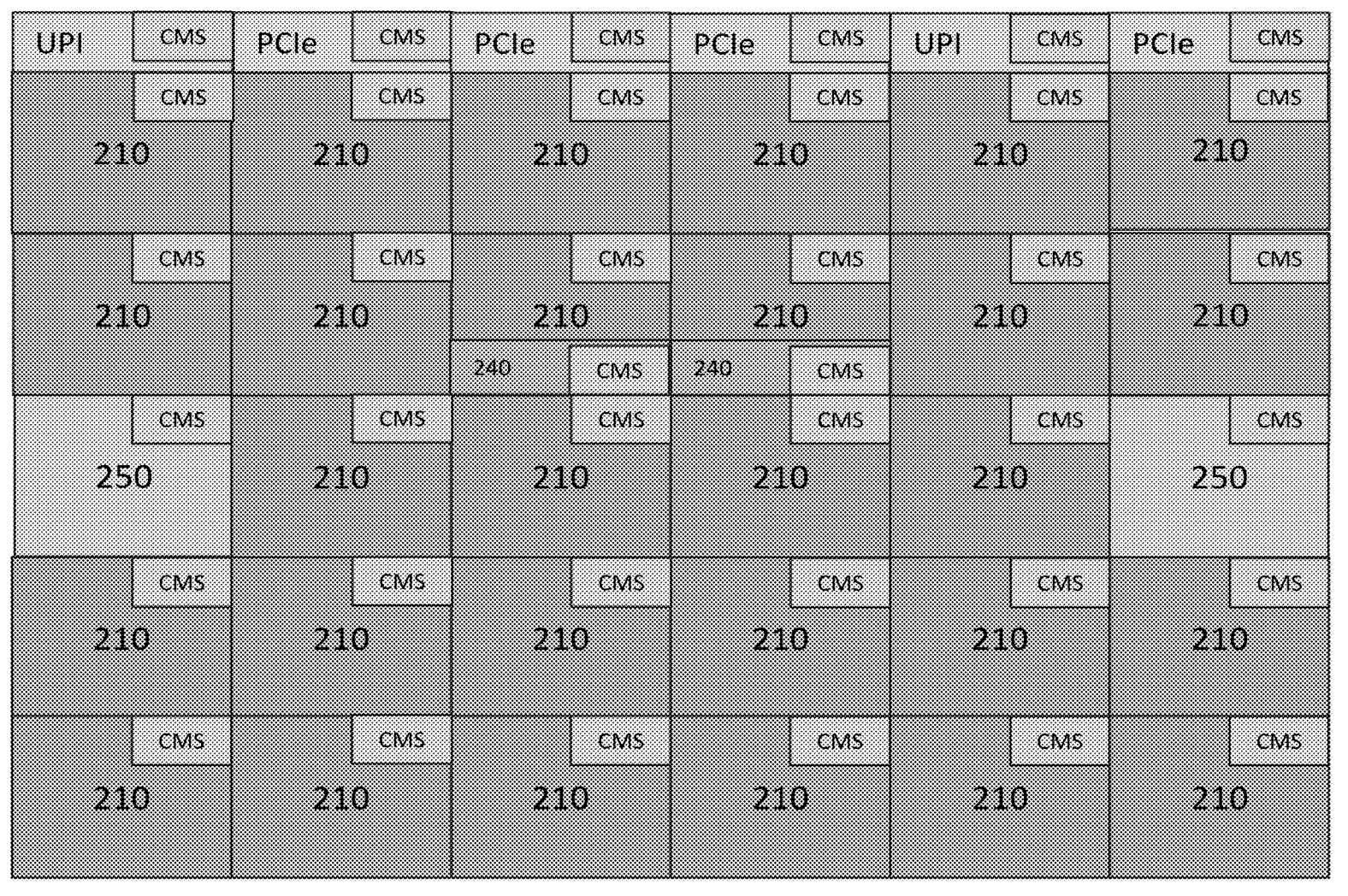
Figure 6D:
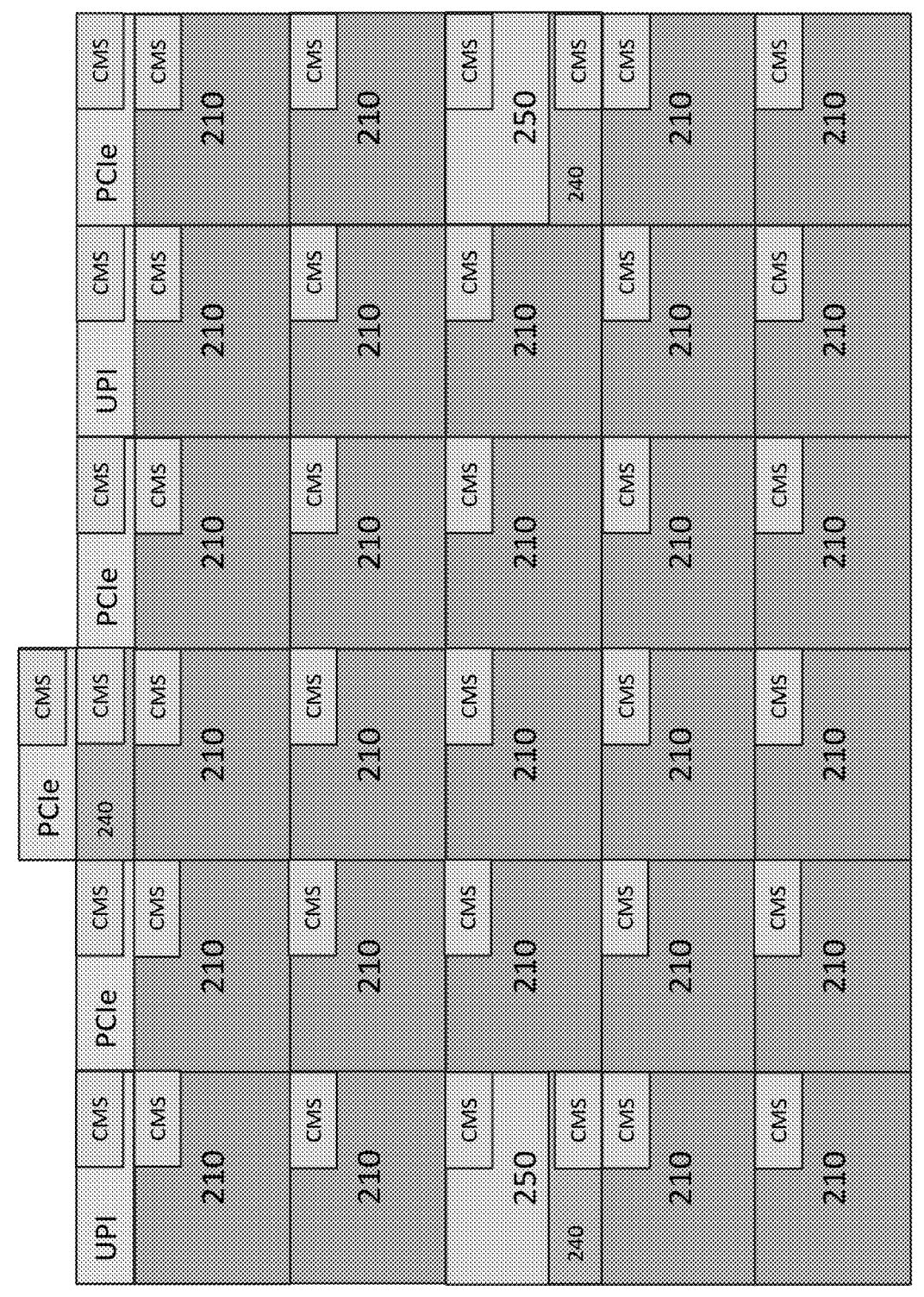

FIG. 6C illustrates an embodiment in which cryptographic engine 240 is placed in a tile separate from IMC 250. Again there is a lower TO latency, with higher average memory access latency due to longer access to cryptographic engine 240. FIG. 6D illustrates another embodiment in which an additional cryptographic engine 240 is provided near the TO ports. There is no change to memory access latency in this embodiment. Additionally, there is lower TO latency and reduced mesh contention. However, there is increased silicon and power cost.

In a further embodiment, a core 210 may transmit cryptographic operations to cryptographic engine 240 via special operations. In such an embodiment, a core 210 initiates the transfer of some data to the in CPU cryptographic engine 240 to accelerate encryption or decryption. The cryptographic engine 240 determines that the destination is the core 210 that transmitted the request, performs the requested operation and transmits the data back to the initiating core 210 rather than the memory 108 or the device link 410. This allows for a higher performance and lower energy usage of some cryptographic operations.

Figure 7A:
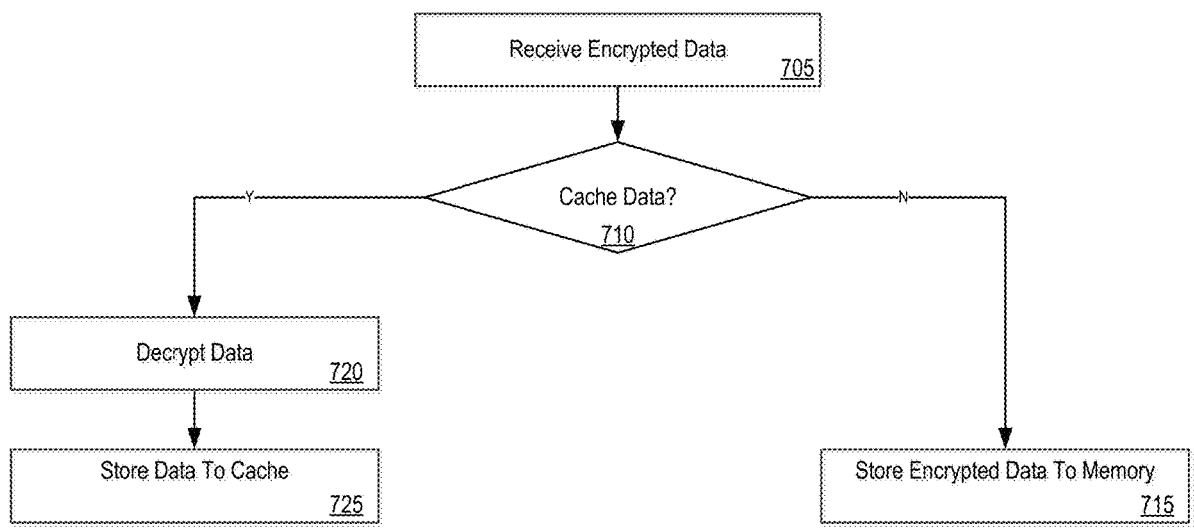
FIGS. 7A & 7B are flow diagrams illustrating embodiments of a process for performing direct cache accesses.
Figure 7B:
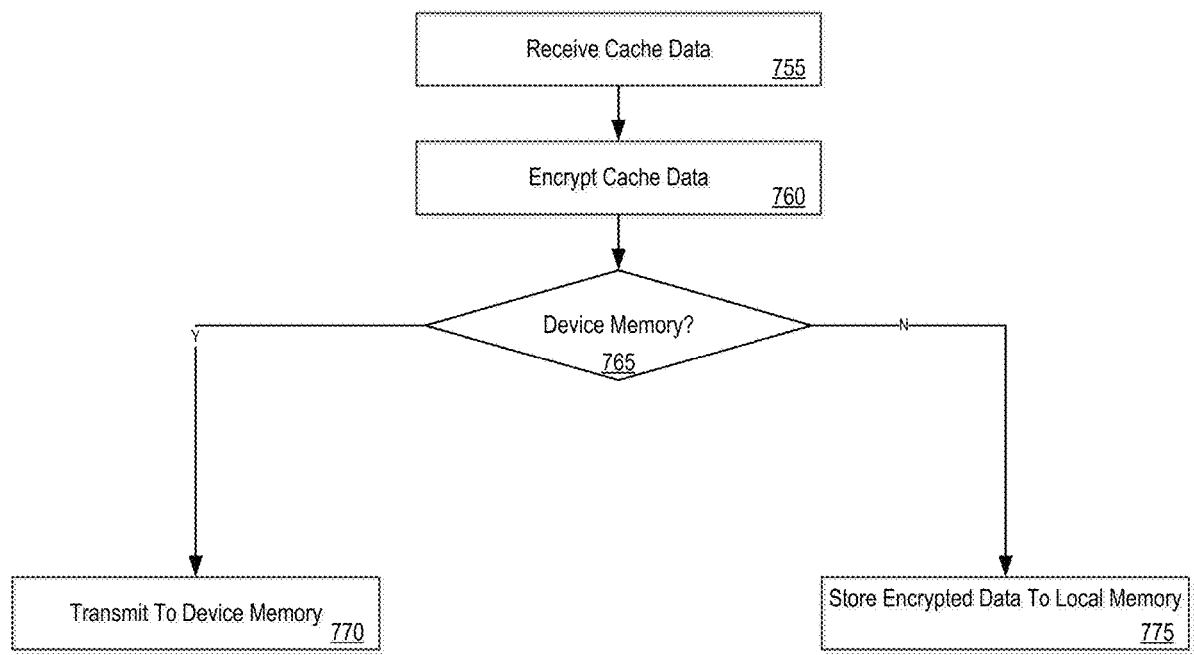

FIGS. 7A & 7B are flow diagrams illustrating embodiments of a process for performing direct cache accesses at a cryptographic engine. FIG. 7A illustrates a process for direct cache accesses for retrieving data from device memory into cache. At processing block 705, encrypted memory data is received at the cryptographic engine from a device memory. At decision block 710, a determination is made as to whether the destination of the data is CPU cache. As discussed above, the cryptographic engine includes a CMS to examine packet data that includes the encrypted memory data to determine the destination. The encrypted memory data is stored in local memory upon a determination that the data is destined for memory, processing block 715. Otherwise, the data is decrypted upon determining that the data is destined for cache, processing block 720. At processing block 725, the data is stored to cache.

FIG. 7B illustrates a process for direct cache accesses for transmitting data to device memory from cache. At processing block 755, memory data is received at the cryptographic engine from CPU cache. At processing block 760, the memory data is encrypted. At decision block 765, a determination is made as to whether the destination of the data is device memory. If so, the data is transmitted to device memory for storage, processing block 770. Otherwise, the data is stored in local memory, processing block 775.

Figure 8:
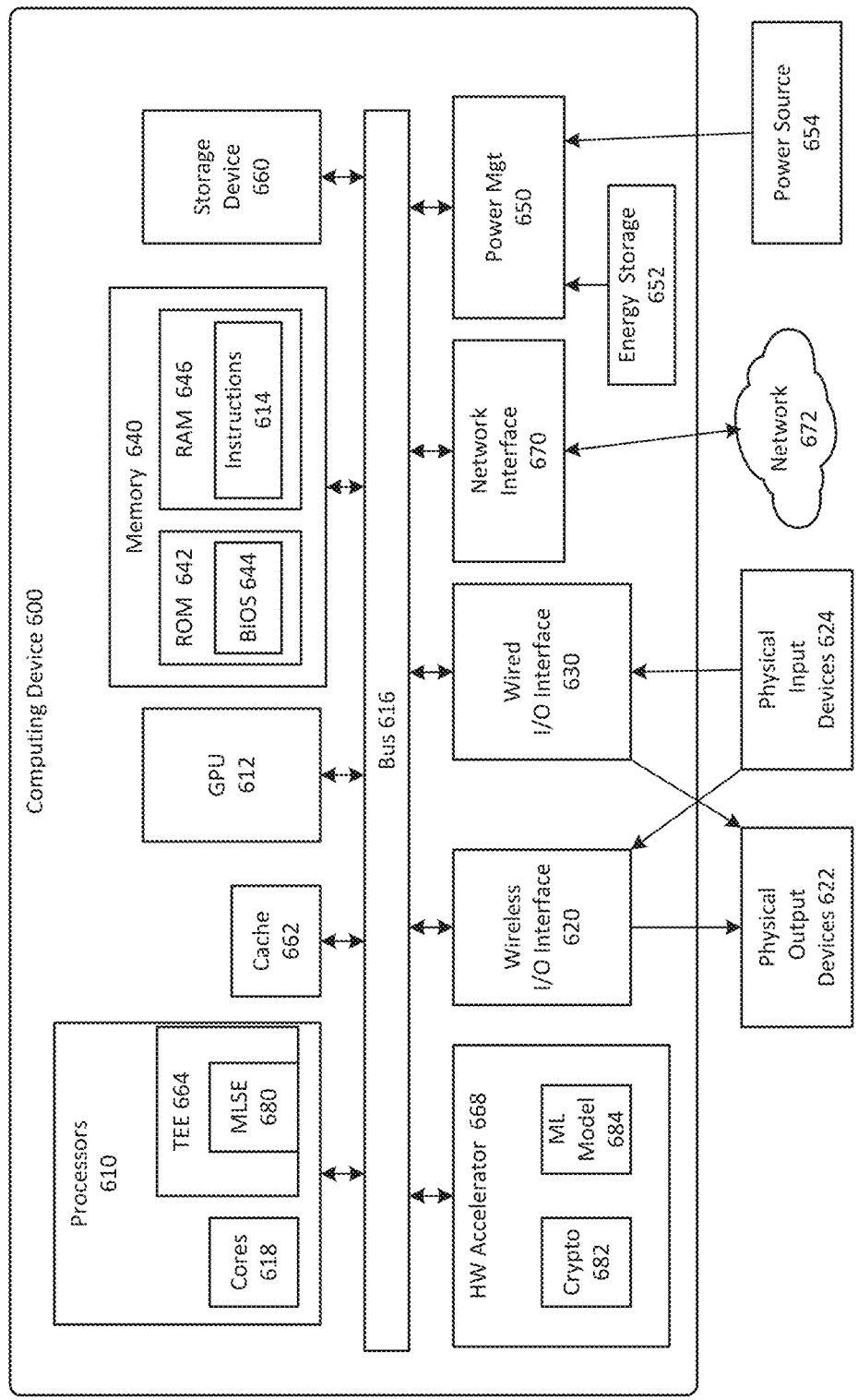
FIG. 8 illustrates one embodiment of a schematic diagram of an illustrative electronic computing device.

FIG. 8 is a schematic diagram of an illustrative electronic computing device to enable enhanced protection against adversarial attacks according to some embodiments. In some embodiments, the computing device 600 includes one or more processors 610 including one or more processors cores 618 and a TEE 664, the TEE including a machine learning service enclave (MLSE) 680. In some embodiments, the computing device 600 includes a hardware accelerator 668, the hardware accelerator including a cryptographic engine 682 and a machine learning model 684. In some embodiments, the computing device is to provide enhanced protections against ML adversarial attacks, as provided in FIGS. 1-7.

The computing device 600 may additionally include one or more of the following: cache 662, a graphical processing unit (GPU) 612 (which may be the hardware accelerator in some implementations), a wireless input/output (I/O) interface 620, a wired I/O interface 630, memory circuitry 640, power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks need not be described in further detail herein, as they will be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising a central processing unit (CPU), including a plurality of processing cores, each having a cache memory, a fabric interconnect coupled to the plurality of processing cores and cryptographic circuitry, coupled to the fabric interconnect including mesh stop station to receive memory data and determine a destination of the memory data and encryption circuitry to encrypt/decrypt the memory data based on a destination of the memory data.

Example 2 includes the subject matter of Example 1, wherein the destination comprises cache memory, a local memory or input-output (TO) memory.

Example 3 includes the subject matter of Examples 1 and 2, wherein the mesh stop station receives encrypted memory data from IO memory.

Example 4 includes the subject matter of Examples 1-3, wherein the mesh stop station determines whether the destination of the memory data is a cache memory within a processing core or local memory.

Example 5 includes the subject matter of Examples 1-4, wherein the encrypted memory data is stored in local memory upon determining that the destination is the local memory.

Example 6 includes the subject matter of Examples 1-5, wherein the encryption circuitry decrypts the encrypted upon determining that the destination is the cache memory and transmits the decrypted memory data to the cache memory.

Example 7 includes the subject matter of Examples 1-6, wherein the mesh stop station receives memory data from a cache memory within a processing core.

Example 8 includes the subject matter of Examples 1-7, wherein the encryption circuitry encrypts the memory data.

Example 9 includes the subject matter of Examples 1-8, wherein the mesh stop station determines whether the destination of the encrypted memory data is TO memory or local memory.

Example 10 includes the subject matter of Examples 1-9, wherein the encrypted memory data is transmitted to the local memory upon determining that the destination is the local memory.

Example 11 includes the subject matter of Examples 1-10, wherein the encrypted memory data is transmitted to the TO memory upon determining that the destination is the TO memory.

Example 12 includes the subject matter of Examples 1-11, wherein the memory data comprises a message type identifier indicating the destination.

Some embodiments pertain to Example 13 that includes a method comprising receiving memory data at a mesh stop station within cryptographic circuitry, determining a destination of the memory data and determining whether an encryption/decryption operation is to be performed on the memory data based on the destination of the memory data.

Example 14 includes the subject matter of Example 13, wherein the memory data comprises encrypted memory data is received from input-output (TO) memory.

Example 15 includes the subject matter of Examples 13 and 14, further comprising determining whether the destination of the encrypted memory data is a cache memory or local memory and storing the encrypted memory data in local memory upon determining the destination is the local memory.

Example 16 includes the subject matter of Examples 13-15, further comprising decrypting the encrypted memory data upon determining that the destination is the cache memory and transmitting the to the cache memory.

Some embodiments pertain to Example 17 that includes at least one computer readable medium having instructions stored thereon, which when executed by one or more processors, cause the processors to receive memory data, determine a destination of the memory data and determine whether an encryption/decryption operation is to be performed on the memory data based on the destination of the memory data.

Example 18 includes the subject matter of Example 17, wherein the memory data comprises memory data received from a cache memory.

Example 19 includes the subject matter of Examples 17 and 18, having instructions stored thereon, which when executed by one or more processors, cause the processors to encrypt the memory data and determine whether the destination of the encrypted memory data is input-output (TO) memory or local memory Example 20 includes the subject matter of Examples 17-19, having instructions stored thereon, which when executed by the one or more processors cause the processors to transmit the encrypted memory data to the local memory upon determining that the destination is the local memory and transmit the encrypted memory data to the TO memory upon determining that the destination is the TO memory.

The embodiments have been described above with reference to specific embodiments. Persons skilled in the art, however, will understand that various modifications and changes may be made thereto without departing from the broader spirit and scope of the embodiment as set forth in the appended claims. The foregoing description and drawings are, accordingly, to be regarded in an illustrative rather than a restrictive sense.

What is claimed is:

1. An apparatus comprising a central processing unit (CPU), including:
 a plurality of processing cores, each having a cache memory;
 a fabric interconnect coupled to the plurality of processing cores; and
 cryptographic circuitry, coupled to the fabric interconnect, including:
  mesh stop station to receive memory data and determine a destination of the memory data; and
  encryption circuitry to perform an encryption operation on the memory data upon determining that a first destination is a cache memory and to transmit the memory data without performing the encryption operation upon determining that the first destination is not cache memory.

2. The apparatus of claim 1, wherein a second destination comprises a local memory and a third destination comprises an input-output (IO) memory.

3. The apparatus of claim 2, wherein the mesh stop station receives encrypted memory data from the IO memory.

4. The apparatus of claim 3, wherein the mesh stop determines whether the destination of the memory data is a cache memory or the local memory.

5. The apparatus of claim 4, wherein the encrypted memory data is stored in the local memory upon determining that the destination is the local memory.

6. The apparatus of claim 5, wherein the encryption circuitry performs a decryption operation to decrypt the encrypted memory data upon determining that the destination is the cache memory and transmits the decrypted memory data to the cache memory.

7. The apparatus of claim 2, wherein the mesh stop station receives memory data from the cache memory.

8. The apparatus of claim 7, wherein the encryption performs an encryption operation to encrypt the memory data.

9. The apparatus of claim 8, wherein the mesh stop station determines whether the destination of the encrypted memory data is IO memory or local memory.

10. The apparatus of claim 9, wherein the encrypted memory data is transmitted to the local memory upon determining that the destination is the local memory.

11. The apparatus of claim 10, wherein the encrypted memory data is transmitted to the IO memory upon determining that the destination is the IO memory.

12. The apparatus of claim 1, wherein the memory data comprises a message type identifier indicating the destination.

13. A method comprising:
receiving memory data at a mesh stop station within cryptographic circuitry;
determining a destination of the memory data;
performing an encryption operation on the memory data upon determining that a first destination is a cache memory; and
transmitting the memory data without performing the encryption operation upon determining that the first destination is not the cache memory.

14. The method of claim 13, wherein a second destination comprises a local memory and a third destination comprises an input-output (IO) memory.

15. The method of claim 14, further comprising:
receiving encrypted memory data from the IO memory;
determining whether the destination of the encrypted memory data is the cache memory or local memory; and
storing the encrypted memory data in local memory upon determining that the destination is the local memory.

16. The method of claim 15, further comprising:
decrypting the encrypted memory data upon determining that the destination is the cache memory; and
transmitting the memory data to the cache memory.

17. At least one computer readable medium having instructions stored thereon, which when executed by one or more processors, cause the processors to:
receive memory data;
determine a destination of the memory data;
perform an encryption operation on the memory data upon determining that a first destination is a cache memory; and
transmit the memory data without performing the encryption operation upon determining that the first destination is not cache memory.

18. The computer readable medium of claim 17, wherein a second destination comprises a local memory and a third destination comprises an input-output (IO) memory.

19. The computer readable medium of claim 18, having instructions stored thereon, which when executed by one or more processors, cause the processors to:
receive memory data comprises from the cache memory;
encrypt the memory data; and
determine whether the destination of the encrypted memory data is the input-output (IO) memory or local memory.

20. The computer readable medium of claim 19, having instructions stored thereon, which when executed by the one or more processors cause the processors to:
transmit the encrypted memory data to the local memory upon determining that the destination is the local memory; and
transmit the encrypted memory data to the IO memory upon determining that the destination is the IO memory.

* * * * *